(12) United States Patent
Fleming, Jr.

(10) Patent No.: US 9,403,116 B2
(45) Date of Patent: Aug. 2, 2016

(54) REGENERATIVE SCRUBBER SYSTEM WITH SINGLE FLOW DIVERSION ACTUATOR

(75) Inventor: Malcolm N. Fleming, Jr., Syracuse, NY (US)

(73) Assignee: CARRIER CORPORATION, Farmington, CT (US)

( * ) Notice: Subject to any disclaimer, the term of this patent is extended or adjusted under 35 U.S.C. 154(b) by 134 days.

(21) Appl. No.: 14/233,028

(22) PCT Filed: Jul. 11, 2012

(86) PCT No.: PCT/US2012/046140
§ 371 (c)(1),
(2), (4) Date: Jan. 15, 2014

(87) PCT Pub. No.: WO2013/012622
PCT Pub. Date: Jan. 24, 2013

(65) Prior Publication Data
US 2014/0216261 A1      Aug. 7, 2014

Related U.S. Application Data

(60) Provisional application No. 61/508,866, filed on Jul. 18, 2011.

(51) Int. Cl.
*B01D 53/04*       (2006.01)
*A23L 3/3427*      (2006.01)
*A23B 7/148*       (2006.01)

(52) U.S. Cl.
CPC ............ *B01D 53/0446* (2013.01); *A23B 7/148* (2013.01); *A23L 3/3427* (2013.01);
(Continued)

(58) Field of Classification Search
CPC ...... A23B 7/148; A23L 3/3427; Y02C 10/08; B01D 53/04; B01D 53/0446; B01D 53/0454; B01D 2253/102; B01D 2253/108; B01D 2257/504; B01D 2259/40005; B01D 2259/4566
USPC ............... 96/121, 124, 130, 152, 154; 95/139
See application file for complete search history.

(56) References Cited

U.S. PATENT DOCUMENTS 2,545,194 A      3/1951   Colburn et al.
3,225,516 A  *  12/1965  Weston .................. B01D 53/04
                                                              95/122

(Continued)

FOREIGN PATENT DOCUMENTS

EP      0565827 A1    10/1993
FR      2523472 A3     9/1983
(Continued)

OTHER PUBLICATIONS

Singapore Search Report for application 2014002596, dated Mar. 2, 2015, 8 pages.

(Continued)

*Primary Examiner* — Frank Lawrence
(74) *Attorney, Agent, or Firm* — Cantor Colburn LLP

(57) ABSTRACT

A regenerative scrubber system is provided for removing a selected gas from an atmosphere within a closed environment. The scrubber system includes a scrubber module having a first scrubber and a second scrubber, each housing a porous mass of regenerative adsorbent material for adsorbing the selected gas, a first flow diversion device disposed upstream of the scrubber module with respect to the gaseous flow from the closed environment, a second flow diversion device disposed downstream of the scrubber with respect to the gaseous flow from the closed environment, and a single actuator operatively associated with each of the first flow diversion device and the second flow diversion device.

16 Claims, 4 Drawing Sheets

(52) U.S. Cl.
CPC ...... *B01D53/0454* (2013.01); *B01D 2253/102* (2013.01); *B01D 2253/108* (2013.01); *B01D 2257/504* (2013.01); *B01D 2259/40005* (2013.01); *B01D 2259/4566* (2013.01); *Y02C 10/08* (2013.01)

(56) References Cited

U.S. PATENT DOCUMENTS

| | | | |
|---|---|---|---|
| 3,487,608 A | | 1/1970 | Graff |
| 3,740,928 A | * | 6/1973 | Schmid ............... A23L 3/34095 426/419 |
| 3,795,749 A | | 3/1974 | Cummin |
| 3,798,333 A | | 3/1974 | Cummin |
| 3,865,924 A | | 2/1975 | Gidaspow et al. |
| 4,127,395 A | * | 11/1978 | McKey et al. .................... 95/10 |
| 4,228,197 A | | 10/1980 | Means |
| 4,303,009 A | | 12/1981 | La Monica |
| 4,716,739 A | | 1/1988 | Harris et al. |
| 4,817,391 A | | 4/1989 | Roe et al. |
| 5,156,009 A | | 10/1992 | Woodruff |
| 5,419,688 A | | 5/1995 | Basinski et al. |
| 5,426,953 A | | 6/1995 | Meckler |
| 5,438,841 A | | 8/1995 | Cahill-O'Brien et al. |
| 5,451,248 A | | 9/1995 | Sadkowski et al. |
| 5,454,968 A | | 10/1995 | Nalette et al. |
| 5,457,963 A | | 10/1995 | Cahill-O'Brien et al. |
| 5,507,539 A | | 4/1996 | Basinski |
| 5,515,693 A | | 5/1996 | Cahill-O'Brien et al. |
| 5,515,769 A | | 5/1996 | Basinski et al. |
| 5,520,720 A | | 5/1996 | Lemcoff |
| 5,623,105 A | | 4/1997 | Liston et al. |
| 5,649,995 A | * | 7/1997 | Gast, Jr. ................ A23L 3/3418 426/419 |
| 5,681,503 A | | 10/1997 | Nalette et al. |
| 5,795,370 A | | 8/1998 | Garrett et al. |
| 5,801,317 A | | 9/1998 | Liston et al. |
| 5,807,423 A | | 9/1998 | Lemcoff et al. |
| 5,814,130 A | | 9/1998 | Lemcoff et al. |
| 5,876,488 A | | 3/1999 | Birbara et al. |
| 5,891,217 A | | 4/1999 | Lemcoff et al. |
| 6,013,293 A | | 1/2000 | De Moor |
| 6,092,430 A | | 7/2000 | Liston et al. |
| 6,364,938 B1 | | 4/2002 | Birbara et al. |
| 6,460,352 B1 | | 10/2002 | Lemcoff et al. |
| 6,521,026 B1 | | 2/2003 | Goto |
| 6,755,892 B2 | | 6/2004 | Nalette et al. |
| 6,763,677 B1 | | 7/2004 | Burchill et al. |
| 6,783,738 B1 | | 8/2004 | Sasaki et al. |
| 6,793,711 B1 | | 9/2004 | Sammells |
| 7,089,751 B2 | | 8/2006 | Fleming, Jr. et al. |
| 7,089,933 B2 | | 8/2006 | Goldblatt et al. |
| 7,665,314 B2 | | 2/2010 | Senf, Jr. et al. |
| 7,736,416 B2 | | 6/2010 | Nalette et al. |
| 7,896,953 B1 | | 3/2011 | Goswami et al. |
| 2004/0035553 A1 | | 2/2004 | Bosher et al. |
| 2005/0132881 A1 | | 6/2005 | Baksh et al. |
| 2005/0257550 A1 | | 11/2005 | Kim |
| 2006/0153747 A1 | | 7/2006 | Sangiovanni et al. |
| 2009/0134008 A1 | | 5/2009 | White et al. |
| 2009/0139254 A1 | | 6/2009 | Landry |
| 2011/0206572 A1 | * | 8/2011 | Mckenna ........... B01D 53/0415 422/211 |

FOREIGN PATENT DOCUMENTS

| | | | |
|---|---|---|---|
| GB | 2190014 A | * | 11/1987 |
| WO | 2004107868 A1 | | 12/2004 |
| WO | 2007033668 A1 | | 3/2007 |
| WO | 2008017307 A1 | | 2/2008 |
| WO | 2009073034 A1 | | 6/2009 |

OTHER PUBLICATIONS

PCT International Preliminary Report on Patentability and Written Opinion of the International Searching Authority for International Applicaiton No. PCT/US2012/046140, Jan. 30, 2014, 10 pages.
PCT International Search Report and Written Opinion of the International Searching Authority for International Application No. PCT/U2012/046140, Jan. 4, 2013, 16 pages.

* cited by examiner

REGENERATIVE SCRUBBER SYSTEM WITH SINGLE FLOW DIVERSION ACTUATOR

CROSS-REFERENCE TO RELATED APPLICATION

Reference is made to and this application claims priority from and the benefit of U.S. Provisional Application Ser. No. 61/508,866, filed Jul. 18, 2011, and entitled REGENERATIVE SCRUBBER SYSTEM WITH SINGLE FLOW DIVERSION ACTUATOR, which application is incorporated herein in its entirety by reference.

BACKGROUND OF THE INVENTION

This invention relates generally to controlling the composition of the atmosphere within a closed environment and, more particularly to the removal of carbon dioxide, and optionally other byproduct of gases from the respiration of fresh produce, from an atmosphere within a closed environment, such as the cargo box of a refrigerated transport container.

Perishable goods are commonly transported in a controlled environment within an enclosed space such as a cargo box of a truck, trailer, sea container, or intermodal container. A refrigeration system, also known as a transport refrigeration system, is used in operative association with the enclosed space within the cargo box for controlling the temperature of the air within the enclosed space. The refrigeration system is operative to maintain the air temperature within the enclosed space within a desired temperature range selected for the particular type of perishable goods stowed within the cargo box. The refrigeration system includes a refrigeration unit including a refrigerant compressor and condenser disposed externally of the cargo box and an evaporator disposed in operative association with the enclosed space of the cargo box. The compressor, condenser and evaporator are connected in a refrigerant circuit in series refrigerant flow relationship in a refrigeration cycle. When the refrigeration system is operating, air is drawn from within the enclosed space by a fan or fans associated with the evaporator, passed through an evaporator disposed within the enclosed space in heat exchange relationship with the refrigerant circulating through the refrigerant circuit to be cooled, and cooled air is then supplied back to the enclosed space.

Certain perishable produce, such as fresh fruits, vegetables and flowers, produce carbon dioxide as a product of the respiration process. In a closed environment, due to post harvest respiration, the carbon dioxide concentration rises and the oxygen concentration drops in the atmosphere within the closed environment. If the oxygen concentration gets too low or the carbon dioxide concentration gets too high, the produce can spoil. Additionally, certain fruits and vegetables and flowers release ethylene and/or ethylene compounds as a byproduct of the ripening process. The presence of ethylene based gases within the enclosed space of the cargo box is known to accelerate the ripening process.

To alleviate these conditions, it is known to introduce fresh air into the closed environment within the cargo box, while simultaneously venting overboard air from the closed environment within the cargo box. Various air exchange systems are available for use in connection with the transport of perishable cargo. For example, U.S. Pat. No. 6,763,677 discloses a manually operated fresh air vent associated with a refrigerated transport container for providing fresh air to the circulating air and exhausting a portion of the circulating air exteriorly of the cargo box of the container.

It is also known in the art to delay ripening of a perishable produce in transit within a container or other enclosed cargo storage space by providing a controlled atmosphere within the enclosed cargo storage space. Typically, a high nitrogen, low oxygen atmosphere is provided by either replacing the atmospheric air within the enclosed cargo storage space with nitrogen gas prior to shipment or displacing the atmospheric air within nitrogen generated by an onboard system that extracts nitrogen from the ambient air. The former approach may be suitable for well sealed containers over a short haul, but inadequate for long haul transport of perishable produce. The latter approach is generally considered more suitable for longer haul transport of perishable produce, but requires higher capital costs, as well as higher operating costs.

It is also known to remove carbon dioxide from the atmosphere within an enclosed space by passing the gas from within the enclosed space through a non-regenerative bed of carbon dioxide adsorbent to scrub carbon dioxide from the gas passing through the adsorbent bed. However non-regenerative systems lose scrubbing efficiency as the adsorbent bed becomes saturated and the carbon dioxide adsorbent material must be replaced. Therefore, such non-regenerative systems have limited application, particularly in the long haul transport of perishable produce.

SUMMARY OF THE INVENTION

A regenerative scrubber system is provided for removing a selected gas from an atmosphere within a closed environment. The scrubber system includes a scrubber module having a first scrubber and a second scrubber, each housing a porous mass of regenerative adsorbent material for adsorbing the selected gas, a first flow diversion device disposed upstream of the scrubber module with respect to the gaseous flow from the closed environment, a second flow diversion device disposed downstream of the scrubber with respect to the gaseous flow from the closed environment, and a single actuator operatively associated with each of the first flow diversion device and the second flow diversion device. The actuator may be configured for selectively positioning each of the first and the second flow diversion devices simultaneously in a first position for operating the first scrubber of the scrubber module in an adsorption mode and the second scrubber of the scrubber module in a regeneration mode, and for selectively positioning each of the first and the second flow diversion device simultaneously in a second position for operating the second scrubber of the scrubber module in an adsorption mode and the first scrubber of the scrubber module in a regeneration mode. In an embodiment, the single actuator may be a linear actuation device. In an embodiment, the single actuator may be a rotary actuation device.

In an aspect of the invention, a regenerative scrubber system is provided for controlling a concentration of carbon dioxide in the atmosphere within a closed environment of a cargo box of a refrigerated transport container to maintain the concentration of carbon dioxide at a desired level.

BRIEF DESCRIPTION OF THE DRAWINGS

For a further understanding of the disclosure, reference will be made to the following detailed description which is to be read in connection with the accompanying drawing, wherein.

DETAILED DESCRIPTION OF THE INVENTION

Figure 1:
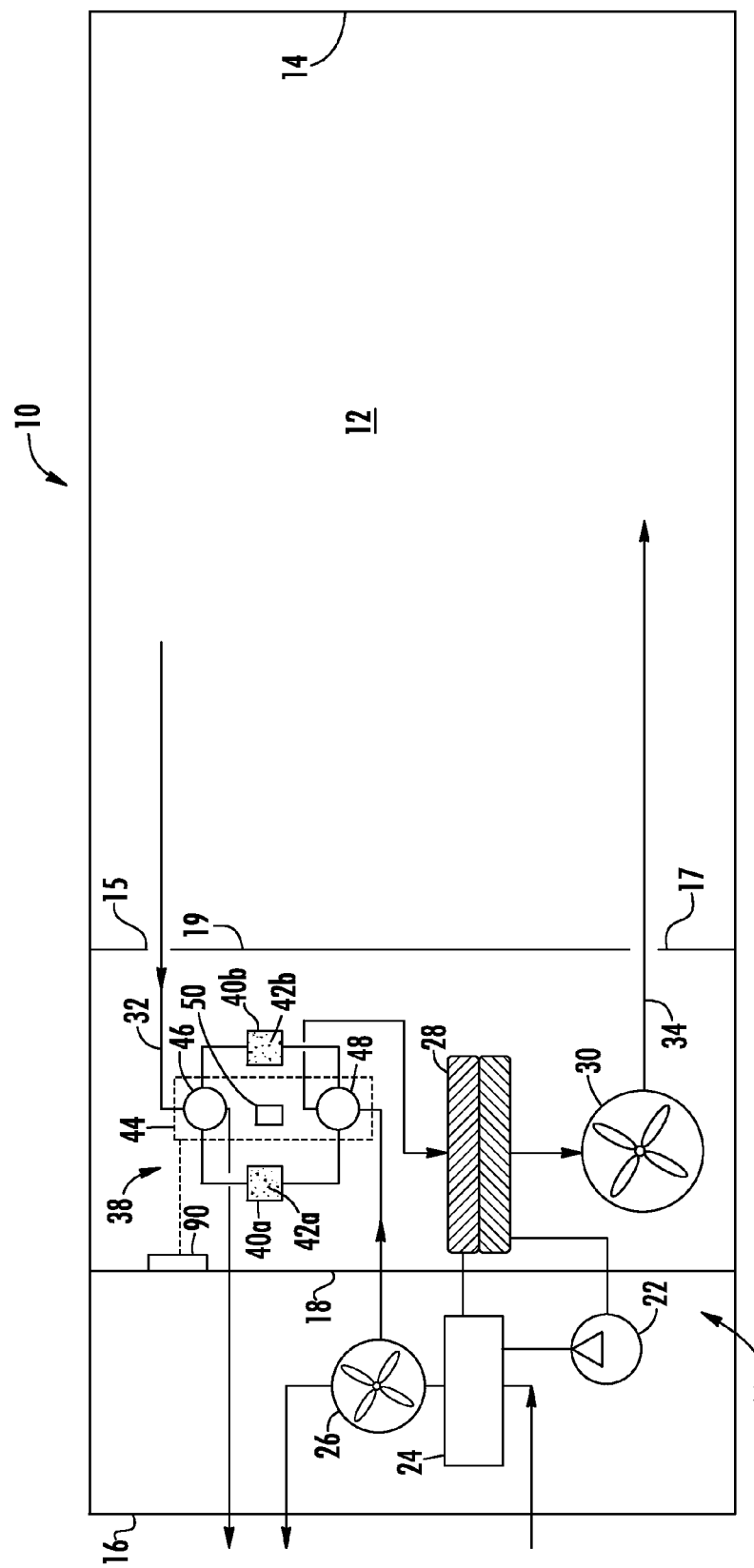
FIG. 1 is a schematic representation of an exemplary embodiment of a refrigerated transport container equipped with an air scrubber system.

Referring initially to FIG. 1 of the drawing, there is depicted schematically an exemplary embodiment of a refrigerated cargo container, generally referenced 10, equipped with a transport refrigeration unit 20. The container 10 defines a closed environment that serves as a cargo space 12, referred to herein as the cargo box, wherein bins, cartons or pallets of cargo (not shown) such as, for example, but not limited to fresh produce, are stacked for transport. The rear wall 14 is provided with one or more doors (not shown) through which access to the cargo box may be had for loading the cargo into the container 10. When the doors are closed, a substantially air-tight, sealed cargo box is established within the container 10 which, to a substantial extent, prevents inside air from escaping and outside penetrating into the cargo box 12.

The transport refrigeration unit 20 is mounted to a wall of the container 10, typically being received in an opening in the forward wall 16 of the container 10 for conditioning the air within the refrigerated closed environment of the cargo box 12. The refrigeration unit 20 includes a compressor 22 with an associated compressor drive motor and a condenser/gas cooler module isolated from the cargo box 12 by a partition wall 18, and an evaporator module in air flow communication with the cargo box 12 through a return air opening 15 and a supply air opening 17 in a back panel 19 of the transport refrigeration unit 20 that also forms a front wall of the cargo box 12.

The condenser/gas cooler module includes a condenser/gas cooler heat exchanger 24, which functions as a refrigerant heat rejection heat exchanger, mounted in the forward section of the refrigeration unit 20 external to the cargo box 12 and positioned in association with one or more condenser/gas cooler fans 26 for drawing ambient air from outside the cargo box 12, typically through an opening at the lower front of the refrigeration unit 20, thence passes that air through the condenser/gas cooler heat exchanger 24 and exhausts that air back into the environment outside the cargo box 12. The evaporator module includes an evaporator heat exchanger 28, which constitutes a refrigerant heat absorption heat exchanger, and one or more evaporator fans 30 that draw air 32 from the cargo box 12 through return air opening 15 to pass through the evaporator heat exchanger 28. The conditioned air 34 is thereafter supplied back into the cargo box 12 of the container 10 through supply air opening 17. The compressor 22, the condenser/gas cooler heat exchanger 24 and the evaporator heat exchanger 28 are disposed in a conventional manner in a refrigerant circuit in a conventional refrigeration cycle arrangement whereby the circulating air is cooled when passing through the evaporator heat exchanger 28 in heat exchange relationship with the refrigerant.

Although the closed environment of the cargo box 12 is substantially air-tight, when freshly harvested produce, such as fruits, vegetables and flowers, are stowed in the cargo box 12, the composition of the atmosphere within the closed environment will change due to respiration by the produce. More specifically, the concentration of carbon dioxide will rise and the concentration of oxygen will fall as the produce ripens. Additionally, ethylene will be produced as a product of the respiration of fresh produce. As ethylene accelerates ripening, the increase of ethylene is undesirable, particularly for long haul transmit. Thus, the term "box air" as used herein refers to the atmosphere within the closed environment of the cargo box irrespective of the gaseous composition of the atmosphere.

A regenerative carbon dioxide removal system 38 is provided onboard the container 10 through which box air from the closed environment within the cargo box 12 may be circulated for removing at least a portion of the carbon dioxide present in the box air. The regenerative carbon dioxide removal system 38 includes a scrubber module 40 including a first scrubber 40$a$ and a second scrubber 40$b$, each containing a porous bed of a regenerative carbon dioxide adsorbent material 42. As will be discussed in further detail later herein, the scrubber module of the regenerative carbon dioxide removal system 38 is configured such that when one of the first and second scrubbers 40$a$, 40$b$ is operating in an adsorption mode, the other one of the first and second scrubber modules is operating in a generation mode.

The regenerative carbon dioxide adsorbent material 42 may itself comprise a material that will also adsorb ethylene or may be mixed with an absorbent that is specific for adsorbing ethylene. It is to be understood that the term "regenerative" means that the efficiency of removal of carbon dioxide, or carbon dioxide and ethylene, can be maintained by desorbing the adsorbed carbon dioxide from the adsorbent material 42. Due to this regenerative characteristic, the regenerative carbon dioxide adsorbent is suitable for use in accordance with the method disclosed herein over the time span of several days or even weeks during the long haul transport of fresh produce. In an embodiment, the regenerative carbon dioxide adsorbent material 42 consists essentially of activated carbon. In an embodiment, the regenerative carbon dioxide adsorbent consists essentially of zeolite. In an embodiment, the regenerative carbon dioxide adsorbent comprises a mixture of activated carbon and at least one other active adsorbent material, such as, for example, but not limited to zeolite.

The regenerative carbon dioxide scrubber system 38 further includes an actuator system 44 including a pair of flow diversion devices 46, 48 and a single actuator 50 operatively coupled to the pair of flow diversion devices 46, 48. The first flow diversion device 46 is disposed upstream of the scrubber module with respect to the higher carbon dioxide content gas flow to be scrubbed, such as, for example, the box air flow from the closed environment within the cargo box 12. The second flow diversion device 48 is disposed downstream of the scrubber with respect to the higher carbon dioxide content gas flow to be scrubbed.

Each of the first and the second flow diversion devices 46, 48 may be selectively positioned in a first position or in a second position. More specifically, the first flow diversion device 46 may be selectively positioned in either one of a first position wherein a flow of circulating box air passes through a first scrubber 40a of the regenerative carbon dioxide adsorbent 42a or a second position wherein a flow of circulating box air passes through a second scrubber 40b of the regenerative carbon dioxide adsorbent 42b. The second flow diversion device 48 may be selectively positioned in either one of a first position wherein a flow of air from outside the container passes through the second scrubber 40b having regenerative carbon dioxide adsorbent material 42b or a second position wherein a flow of air passes through the first scrubber 40a having regenerative carbon dioxide adsorbent material 42a.

The single actuator 50 operatively associated with each of the first flow diversion device 46 and the second flow diversion device 48 is configured for selectively positioning each of the first and the second flow diversion devices 46, 48 simultaneously in the first position and for selectively positioning each of the first and the second flow diversion device simultaneously in the second position. More specifically, for example, the single actuator 50 may be configured for selectively positioning each of the first and the second flow diversion devices 46, 48 simultaneously in the first position for operating the first scrubber 40a of the scrubber module in an adsorption mode and the second scrubber 40b of the scrubber module in a regeneration mode, or for selectively positioning each of the first and the second flow diversion devices 46, 48 simultaneously in the second position for operating the second scrubber 40b of the scrubber module in an adsorption mode and the first scrubber 40a of the scrubber module in a regeneration mode. Thus, while the carbon dioxide adsorbent material 42 in one scrubber is exposed to the higher carbon dioxide content flow, i.e. the flow of circulating box air drawn from with the closed environment of the cargo box 12, the carbon dioxide adsorbent material in the other scrubber is exposed to the lower carbon dioxide content flow, i.e. the flow of regeneration air, for example air drawn from outside the cargo box 12.

Figure 2:
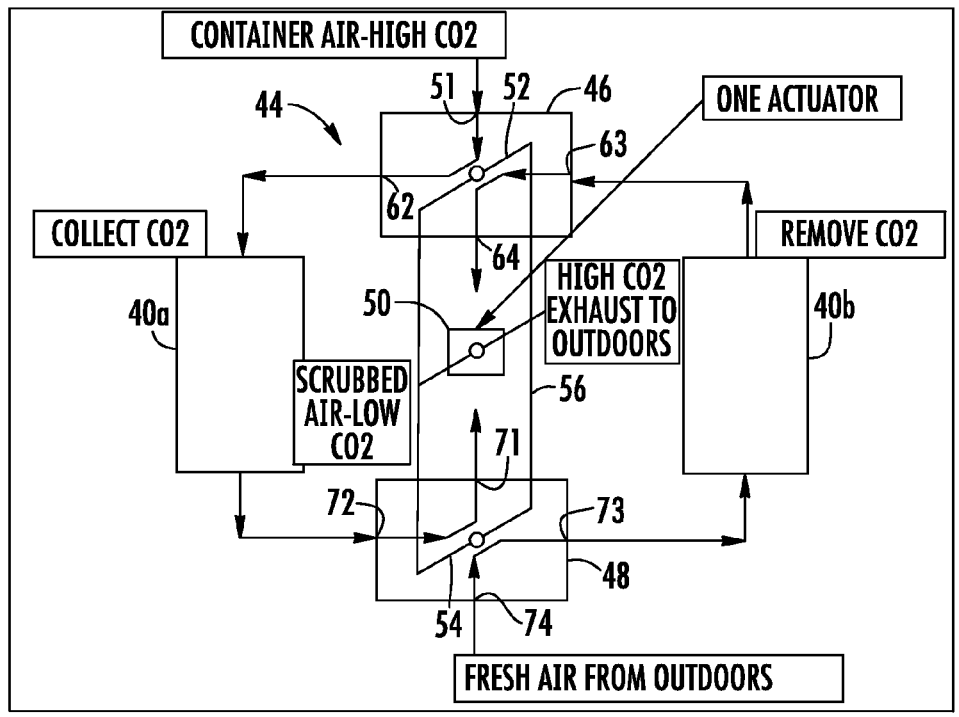
FIG. 2 is a schematic representation of an exemplary embodiment of a scrubber module with a single linear actuator system for selectively directing air flow from within the box and from outside the box between a first and a second scrubber, illustrated with the first scrubber in the adsorption mode and the second scrubber in the regeneration mode.
Figure 3:
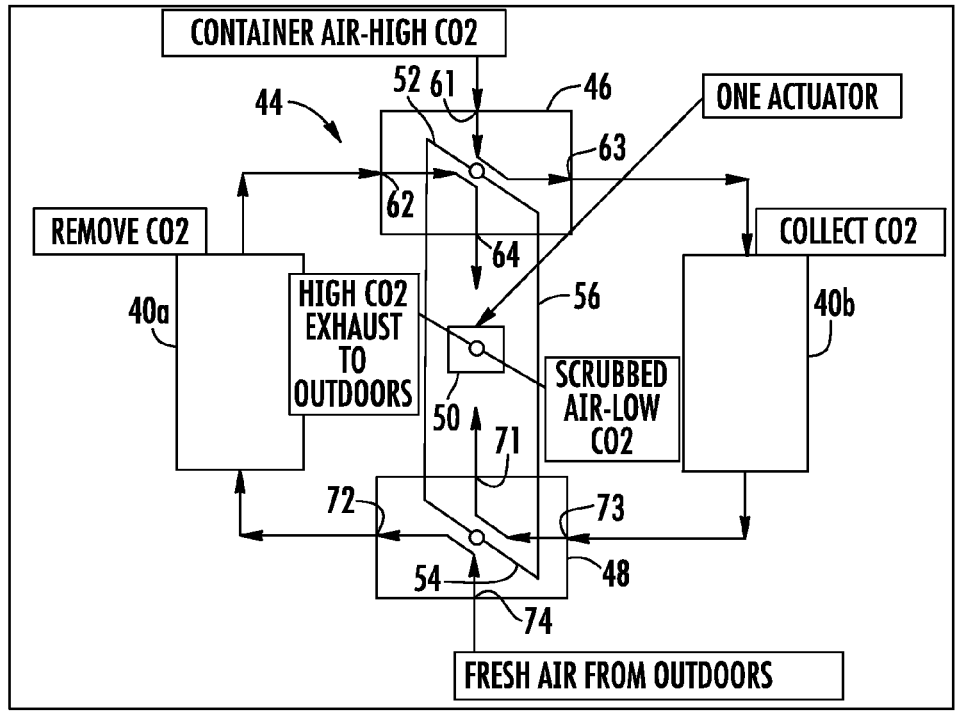
FIG. 3 is a schematic representation of an exemplary embodiment of a scrubber module with a single linear actuator system for selectively directing air flow from within the box and from outside the box between a first and a second scrubber, illustrated with the first scrubber in the regeneration mode and the second scrubber in the adsorption mode.

Referring now to FIGS. 2 and 3, there is depicted a linear actuation embodiment of the actuator system 44 wherein the actuator 50 further comprises a first flow diverter 52 operatively associated with the first flow diversion device 46, a second flow diverter 54 operatively associated with the second flow diversion device 48, and a linkage mechanism 56 interconnecting each the respective first and second flow diverters and the actuator 50 for simultaneous and coordinated linear movement in response to the actuator 50. The first and second flow diverters 52, 54 may, for example, comprise dampers disposed within an intersection of four internal passages within the respective flow diversion devices 46, 48. The actuator 50 may comprise a motor, a solenoid or other device for imparting a linear movement to the linkage mechanism 56 for moving the first and second flow diverters 52, 54 simultaneously in a coordinated manner whereby the four flows, including the higher carbon dioxide content flow to be scrubbed, the lower carbon dioxide content scrubbed flow, the regeneration air flow drawn from outside the cargo box 12, and the exhaust regeneration air flow, may be selectively directed to four different flow paths simultaneously and quickly, typically in less than a minute.

In this embodiment, the first flow diversion device 46 includes a first port 61 in flow communication with the closed environment within the cargo box 12, a second port 62 in flow communication with the first scrubber 40a of the scrubber module, a third port 63 in flow communication with the second scrubber 40b of the scrubber module, and a fourth port 64 in flow communication with an environment outside the cargo box 12. Additionally, the first flow diverter 52 is disposed in operative association with the first flow diversion device 46 and is selectively positionable in either a first position wherein the first port 61 is in flow communication with the second port 62 and the third port 63 is in flow communication with the fourth port 64, or a second position wherein the first port 61 is in flow communication with the third port 63 and the second port 62 is in flow communication with the fourth port 64.

Similarly, in this embodiment, the second flow diversion device 48 includes a first port 71 in flow communication with the closed environment within the cargo box 12, a second port 72 in flow communication with the first scrubber 40a of the scrubber module, a third port 73 in flow communication with the second scrubber 40b of the scrubber module, and a fourth port 74 in flow communication with an environment outside the cargo box 12. Additionally, the second flow diverter 54 is disposed in operative association with the second flow diversion device 48 and is selectively positionable in either a first position wherein the second port 72 is in flow communication with the first port 71 and the fourth port 74 is in flow communication with the third port 73, or a second position wherein the third port 73 is in flow communication with the first port 71 and the fourth port 74 is in flow communication with the second port 72.

When the first and second flow diverters 52, 54 are positioned in their respective first positions by the single actuator 50, as depicted in FIG. 2, the first scrubber 40a receives the flow of circulating box air and operates in the adsorption mode whereby carbon dioxide is removed from the box air flow and the scrubbed air flow is returned to the cargo box 12, while the second scrubber 40b receives a flow of regeneration air and operates in the regeneration mode whereby carbon dioxide is removed from the carbon dioxide adsorbent material 42b of the second scrubber 40b and is exhausted outside of the cargo box. When the first and second flow diverters 52, 54 are positioned in their respective second positions by the single actuator 50, as depicted in FIG. 3, the second scrubber 40b receives the flow of circulating box air and operates in the adsorption mode whereby carbon dioxide is removed from the box air flow and the scrubbed air flow returned to the cargo box 12, while the first scrubber 40a receives a flow of regeneration air and operates in the regeneration mode whereby carbon dioxide is removed from the carbon dioxide adsorbent material 42a of the first scrubber module 40a and is exhausted outside the cargo box.

Figure 4:
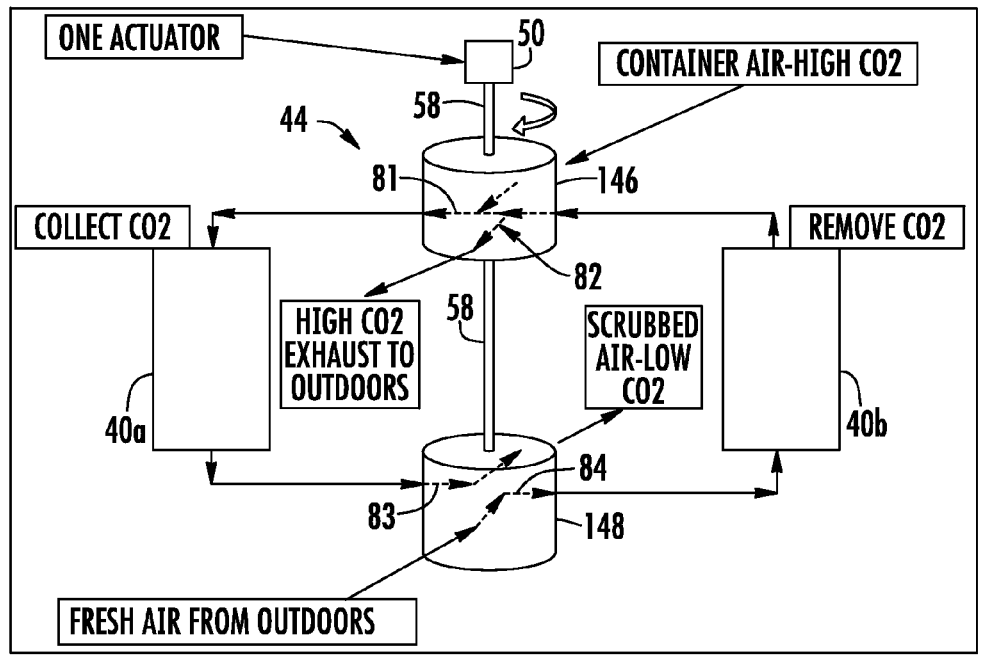
FIG. 4 is a schematic representation of an exemplary embodiment of a scrubber module with a single rotary actuator system for selectively directing air flow from within the box and from outside the box between a first and a second scrubber, illustrated with the first scrubber in the adsorption mode and the second scrubber in the regeneration mode.
Figure 5:
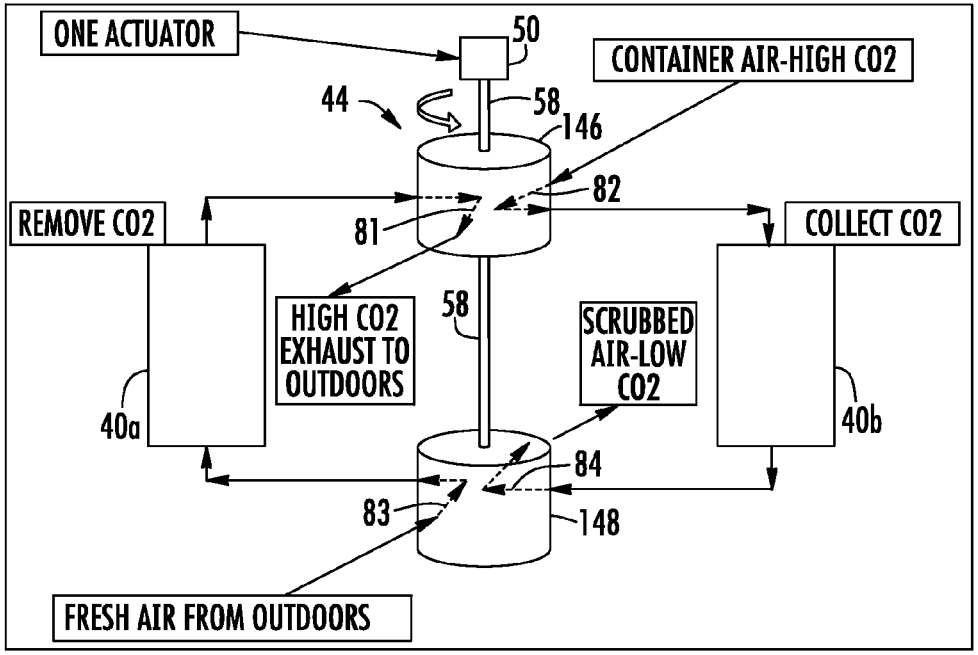
FIG. 5 is a schematic representation of an exemplary embodiment of a scrubber module with a single rotary actuator system for selectively directing air flow from within the box and from outside the box between a first and a second scrubber, illustrated with the first scrubber in the regeneration mode and the second scrubber in the adsorption mode.

Referring now to FIGS. 4 and 5, there is depicted a rotary actuation embodiment of the actuator system 44 wherein each of the first and second flow diversion devices comprises a rotary valve and the actuator 50 includes a shaft 58 connecting to both a first rotary flow diversion valve 146 and a second rotary flow diversion valve 148. The first rotary flow diversion valve 146 has a first flow passage 81 and a second flow passage 82. The second rotary flow diversion valve 148 has a third flow passage 83 and a fourth flow passage 84. In an embodiment, each of the first and second rotary flow diversion valves comprises a ball valve.

Each of the first and second rotary flow diversion valves 146, 148 is selectively positionable by the single actuator 50 in one of a first position or a second position depending upon which of the first and second scrubber modules is to be operated in the adsorption mode. In this embodiment, the actuator 50 is again configured to position both of the first and second rotary diversion valves 146, 148 in its respective first position as depicted in FIG. 4 when the first scrubber 40a is to be operated in the adsorption mode, and to position both of the first and second rotary diversion valves 146, 148 in its respective second position as depicted in FIG. 5 when the second scrubber 40b is to be operated in the adsorption mode. To position the first and second rotary diversion valves 146, 148 simultaneously and in a coordinated manner, the actuator 50, which may comprise a motor or a solenoid or other device for imparting rotational movement to the shaft 58, rotates the shaft 58 through a desired rotational movement.

When the first scrubber 40a is to be operated in an adsorption mode and the second scrubber 40b is to be operated in a regeneration mode, as depicted in FIG. 4, the actuator 50 rotates the shaft 58 clockwise such that the first rotary flow diversion valve 146 is positioned in its first position wherein the first flow passage 81 provides a flow path for directing a flow of circulating box air to the first scrubber 40a and the second flow passage 82 provides a flow path for directing exhaust regeneration air from the second scrubber 40b to be exhausted outside the cargo box, and the second rotary flow diversion valve 148 is also positioned in its first position wherein the third flow passage 83 provides a flow path for directing scrubbed box air discharged from the first scrubber 40a back into the cargo box 12 and the fourth flow passage provides a flow path for directing a flow of regeneration air into the second scrubber 40b.

When the second scrubber 40b is to be operated in an adsorption mode and the first scrubber 40a is to be operated in a regeneration mode, as depicted in FIG. 5, the actuator 50 rotates the shaft 58 counterclockwise such that the first rotary flow diversion valve 146 is positioned in its second position wherein the second flow passage 82 provides a flow path for directing a flow of circulating box air to the second scrubber 40b and the first flow passage 81 provides a flow path for directing exhaust regeneration air from the first scrubber 40a to be exhausted outside the cargo box, and the second rotary flow diversion valve 148 is also positioned in its second position wherein the fourth flow passage 84 provides a flow path for directing scrubbed box air discharged from the second scrubber 40b back to the cargo box 12 and the third flow passage 83 provides a flow path for directing a flow of regeneration air into the first scrubber 40a.

Thus, the single actuator 50 imparts a rotary movement to the shaft 58 for moving the first and second rotary flow diversion valves 146, 148 simultaneously in a coordinated manner whereby the four flows, including the higher carbon dioxide content flow to be scrubbed, the lower carbon dioxide content flow that has been scrubbed, the regeneration air flow from outside the cargo box, and the exhaust of the regeneration air flow, may be selectively directed to four different flow paths simultaneously and quickly, typically in less than a minute.

In refrigerated transport applications, onboard fans 26, 30 (shown in FIG. 1) associated with the refrigerant unit may provide the force for moving the respective air flows through the porous beds of regenerative carbon dioxide adsorbent material. The evaporator fan(s) 30 may be used to pass air from within the closed environment of the cargo box 12 through that portion of the carbon dioxide adsorption material in an adsorption mode, and thence direct the scrubbed air back to the cargo box 12. The condenser fan(s) 26 may be used to pass air from outside the cargo box 12 through that portion of the carbon dioxide adsorbent material in a regeneration mode, and then exhaust the carbon dioxide laden regeneration air back into the atmosphere outside the cargo box 12.

Referring again to FIG. 1, a controller 90 may be provided in operative association with the actuation system 44 for controlling operation of the actuator 50 in selectively positioning the first and second flow diversion devices 46, 48 in their respective first and second positions. For example, when the scrubber module 40 is mounted onboard the refrigerated transport container 10 in operative association with the cargo box 12 defining a closed environment, the controller 90 may be configured for controlling the single actuator for maintaining a concentration of carbon dioxide in an atmosphere within the closed environment of the cargo box at a desired level.

As noted previously, the existing fans 26 and 30 of the transport refrigeration unit 20 mounted to the forward wall 16 of the mobile refrigerated transport container 10 may be employed for moving air flow through the carbon dioxide adsorbent material. More specifically, the condenser fan 26 operatively associated with the refrigerant heat rejection heat exchanger 24 may be employed for moving regeneration air, for example ambient air bypassing the refrigerant heat rejection heat exchanger 24 or exhausting from the refrigerant heat rejection heat exchanger 24, through the carbon dioxide adsorbent material 42 during a regeneration cycle. The evaporator fan 30 operatively associated with the refrigerant heat absorption heat exchanger (evaporator) 28 may be employed for circulating carbon dioxide containing air from within the cargo space 12 of the container 10 through the carbon dioxide adsorbent material 42 during an adsorption cycle.

To facilitate the use of the existing fans 26 and 30 of the transport refrigeration unit 20, it is desirable to reduce the pressure drop incurred by the air in flowing through the carbon dioxide adsorbent material. If the porous mass of carbon dioxide adsorbent material 42a, 42b is contained within the scrubber modules 40a, 40b, respectively, in the form of a packed bed of granules or pellets of carbon dioxide adsorbent material, pressure drop may be limited by reducing the height of the bed and/or by reducing the packing density of the granules or pellets of carbon dioxide adsorbent material within the bed. Alternatively, lower pressure drop arrangements of the carbon dioxide adsorbent material may also be employed instead of a packed bed arrangement.

Figure 6:
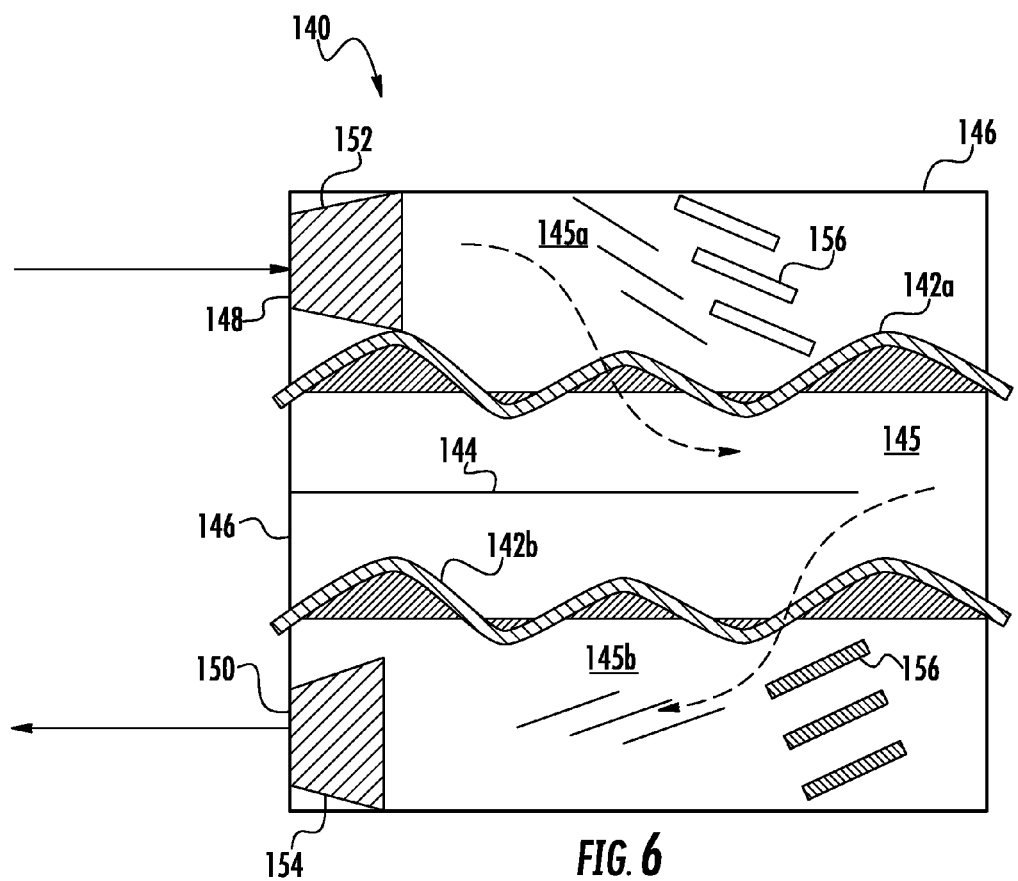
FIG. 6 is a schematic illustration of an exemplary embodiment of a scrubber module with sheets of carbon dioxide absorbent material.

Referring now to FIG. 6, an exemplary embodiment of a lower pressure drop scrubber module 140 is depicted wherein the carbon dioxide adsorbent material housed therein comprises one or more sheets of a fibrous mesh 142. The scrubber module 140 includes a flow baffle 144 extending longitudinally within the scrubber module housing 146 to define a generally U-shaped flow passage 145 within the interior of the scrubber module housing 146. The scrubber module housing 146 includes a flow inlet 148 opening to a first portion 145a of the flow passage 145 on one side of the flow baffle 144 and a flow outlet 150 opening to a second portion 145b of the flow passage 145 on the other side of the flow baffle 144. A first sheet of fibrous mesh 142a of carbon dioxide adsorbent material is disposed within the first portion 145a of the flow passage 145 in the flow path of air flowing through the flow passage 145. A second sheet of fibrous mesh 142b of carbon dioxide adsorbent material is disposed within the second portion 145b of the flow passage 145 in the flow path of air flowing through the flow passage 145.

The fibrous mesh sheets 142a, 142b may comprise a mesh sheets formed by fibers of a carbon dioxide adsorbent material per se, for example, but not limited to, activated carbon fibers, or a mesh of fibers of a support material coated with particles or fibers of a carbon dioxide adsorbent material, such as, but not limited to, activated carbon particles. In an embodiment, the fibrous mesh sheets 142a, 142b may comprise corrugated sheets such as depicted in FIG. 6.

The scrubber module 140 may also include an inlet nozzle 152 disposed at the inlet 148 to the housing 146 and an outlet nozzle 154 disposed at the outlet to the housing 146. The inlet nozzle 152 may be a divergent nozzle that diverges in the direction of air flow through the nozzle. The outlet nozzle 154 may be a convergent nozzle that converges in the direction of air flow through the nozzle. The nozzles 152 and 154, respectively, direct the air flow entering and leaving the scrubber module 140 and contribute to the low pressure drop characteristic of the scrubber module 140. The inlet nozzle 152 receives container air to be scrubbed of carbon dioxide when the scrubber module 140 is operating in the adsorption mode and received regeneration air when the scrubber module 140 is operating in the regeneration mode. In the adsorption mode, the scrubbed container air discharges from the scrubber module 140 through the outlet nozzle 154. In the regeneration mode also, the carbon dioxide-laden regeneration air discharges from the scrubber module 140 through the outlet nozzle 154. Ergo, in this embodiment of the scrubber module, the flow of incoming container air to be scrubbed in the adsorption mode and the flow of incoming regeneration air in the regeneration mode pass in the same direction through the carbon dioxide adsorbent material, rather than flowing in counter-current relationship through the porous mass as in the embodiments of the scrubber modules 40 depicted in FIGS. 2-5.

Additionally, at least one or a plurality of flow vanes 156 may be disposed within the housing 146 in each of the portions 145a and 145b of the flow passage 145 for directing the air flow toward the fibrous mesh sheets 142a, 142b of carbon dioxide adsorbent material. The flow vanes 156 may be constructed of carbon dioxide adsorbent material per se, such as adsorbent fibers of activated carbon. Alternatively, the flow vanes 156 may be formed of a support fiber material coated with a carbon dioxide adsorbent material, such as, for example but not limited to, powder, particles or granules of activated carbon.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

I claim:

1. A refrigerated transport container comprising:
   a cargo box defining a closed environment;
   a refrigeration unit including a compressor, a heat rejection heat exchanger and a heat absorption heat exchanger;
   a regenerative scrubber system for removing a selected gas from an atmosphere within the closed environment, the regenerative scrubber system comprising:
   a scrubber module having a first scrubber and a second scrubber, each housing a porous mass of regenerative adsorbent material for adsorbing the selected gas;
   a first flow diversion device disposed upstream of the scrubber module with respect to the gaseous flow from the closed environment, the first flow diversion device selectively positionable between a first position and a second position;
   a second flow diversion device disposed downstream of the scrubber and upstream of the heat absorption heat exchanger with respect to the gaseous flow from the closed environment, the second flow diversion device selectively positionable between a first position and a second position; and
   a single actuator operatively associated with each of the first flow diversion device and the second flow diversion device, the actuator configured for selectively positioning each of the first and the second flow diversion devices simultaneously in either the first position or in the second position.

2. The regenerative scrubber system as recited in claim 1 wherein the actuator is configured for selectively positioning each of the first and the second flow diversion devices simultaneously in either a first position for operating the first scrubber of the scrubber module in an adsorption mode and the second scrubber of the scrubber module in a regeneration mode, or a second position for operating the second scrubber of the scrubber module in an adsorption mode and the first scrubber of the scrubber module in a regeneration mode.

3. The regenerative scrubber system as recited in claim 2 wherein the first flow diversion device comprises:
   a first port in flow communication with air within the enclosed environment;
   a second port in flow communication with the first scrubber of the scrubber module;
   a third port in flow communication with the second scrubber of the scrubber module;
   a fourth port in flow communication with air outside the enclosed environment; and
   a flow diverter, the flow diverter selectively positionable in either a first position wherein the first port is in flow communication with the second port and the third port is in flow communication with the fourth port, or a second position wherein the first port is in flow communication with the third port and the second port is in flow communication with the fourth port.

4. The regenerative scrubber system as recited in claim 3 wherein the second flow diversion device comprises:
   a first port in flow communication with air within the enclosed environment;
   a second port in flow communication with the first scrubber of the scrubber module;
   a third port in flow communication with the second scrubber of the scrubber module;
   a fourth port in flow communication with air outside the enclosed environment; and
   a flow diverter, the flow diverter selectively positionable in either a first position wherein the second port is in flow communication with the first port and the fourth port is in flow communication with the third port, or a second position wherein the third port is in flow communication with the first port and the fourth port is in flow communication with the second port.

5. The regenerative scrubber system as recited in claim 4 wherein the actuator further comprises a linkage mechanism interconnecting the respective flow diverters of the first and second flow diversion devices for coordinated linear movement for selectively positioning the respective flow diverters in the first or second position.

6. The regenerative scrubber system as recited in claim 2 wherein the actuator further comprises a rotary actuator.

7. The regenerative scrubber system as recited in claim 6 wherein the first flow diversion device comprises a rotary flow diversion valve having a first internal flow passage and a second internal flow passage and the second flow diversion device comprises a rotary diversion valve having a third internal flow passage and a fourth internal flow passage.

8. The regenerative scrubber system as recited in claim 7 wherein the each of the first rotary diversion valve and the second rotary diversion valve comprises a ball valve.

9. The regenerative scrubber system as recited in claim 1 further comprising a controller operatively associated with the single actuator that is configured for controlling the single actuator to maintain a concentration of carbon dioxide in the atmosphere within the closed environment of the cargo box within a desired range.

10. A regenerative scrubber system for removing a selected gas from an atmosphere within a closed environment, the regenerative scrubber system comprising:
 a scrubber module having a first scrubber and a second scrubber, each housing a porous mass of regenerative adsorbent material for adsorbing the selected gas;
 a first flow diversion device disposed upstream of the scrubber module with respect to the gaseous flow from the closed environment, the first flow diversion device selectively positionable between a first position and a second position;
 a second flow diversion device disposed downstream of the scrubber with respect to the gaseous flow from the closed environment, the second flow diversion device selectively positionable between a first position and a second position; and
 a single actuator operatively associated with each of the first flow diversion device and the second flow diversion device, the actuator configured for selectively positioning each of the first and the second flow diversion devices simultaneously in either the first position or in the second position;
 wherein the scrubber module comprises:
 a housing defining an interior volume;
 a flow baffle extending longitudinally within the interior volume to define a generally U-shaped flow passage having an upstream portion on a first side of the flow baffle and a downstream portion on a second side of the flow baffle;
 a first sheet of adsorbent material for selectively adsorbing the selected gas from the air flow, the first sheet disposed in the upstream portion of the flow passage; and
 a second sheet of adsorbent material for selectively adsorbing the selected gas from the air flow, the second sheet disposed in the downstream portion of the flow passage.

11. The regenerative scrubber system as recited in claim 10 wherein the housing includes an inlet opening to the upstream portion of the flow passage and an outlet opening to the downstream portion of the flow passage.

12. The regenerative scrubber system as recited in claim 11 further comprising a divergent inlet nozzle disposed at the housing inlet opening to the upstream portion of the flow passage, the divergent inlet nozzle diverging in the direction of flow through the inlet nozzle.

13. The regenerative scrubber system as recited in claim 12 further comprising a convergent nozzle disposed at the housing outlet opening to the downstream portion of the flow passage, the convergent nozzle converging in the direction of flow through the outlet nozzle.

14. The regenerative scrubber system as recited in claim 10 further comprising at least one flow directing vane disposed in the upstream portion of the flow passage and at least one flow directing vane disposed in the downstream portion of the flow passage.

15. The regenerative scrubber system as recited in claim 14 wherein the at least one flow directing vane disposed in the upstream portion of the flow passage and the at least one flow directing vane disposed in the downstream portion of the flow passage comprise a carbon dioxide adsorbent material.

16. The regenerative scrubber system as recited in claim 14 wherein the at least one flow directing vane disposed in the upstream portion of the flow passage and the at least one flow directing vane disposed in the downstream portion of the flow passage comprise a support member coated with a carbon dioxide adsorbent material.

* * * * *